INVENTOR
Solomon L. Miller

BY Sughrue, Rothwell, Mion & Zinn
ATTORNEYS

June 18, 1963 S. L. MILLER 3,094,613
BINARY FULL ADDER UTILIZING ASYMMETRIC P-N-P-N TRANSISTORS
OPERATED AT DIFFERENT SATURATION CURRENT LEVELS
Filed Dec. 17, 1959 2 Sheets-Sheet 2

INVENTOR
Solomon L. Miller

BY
Sughrue, Rothwell, Mion & Zinn
ATTORNEYS

United States Patent Office 3,094,613

Patented June 18, 1963

3,094,613

BINARY FULL ADDER UTILIZING ASYMMETRIC P-N-P-N TRANSISTORS OPERATED AT DIFFERENT SATURATION CURRENT LEVELS

Solomon L. Miller, Poughkeepsie, N.Y., assignor to International Business Machines Corporation, New York, N.Y., a corporation of New York Filed Dec. 17, 1959, Ser. No. 860,223

12 Claims. (Cl. 235—176)

This invention relates to a transistor logical operation circuit, and more particularly to a circuit employing two transistor structures having a common emitter input whose collector outputs respectively reflect the sum and carry indications of full binary addition.

As is well known in the computing art, a binary full adder circuit is one having three inputs thereto and two outputs therefrom. To two of the inputs are applied signals representing the numbers X and Y, which are binary digits of equal order, while to the third input is applied a signal representing a number C which is the carry digit resulting from the addition of the two binary digits in the preceding order. On the two outputs from the adder are signals representing the sum and carry binary digits resulting from the addition of the three binary digits at the inputs. When adding together two serial trains of binary digits, only one full adder circuit is required with a feedback delay loop between the carry output and the carry input. When parallel addition of two binary numbers is desired, then a full adder circuit for each binary order is required with a connection between the carry output of one order to the carry input of the next higher order. The logical process of addition in the binary number system, sometimes known as a number system having the radix two, is shown in the following Table 1.

*Table 1*

| Input | | | Output | |
|---|---|---|---|---|
| X | Y | Z | S | C |
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 0 | 1 | 0 | 0 | 1 |
| 1 | 0 | 1 | 0 | 1 |
| 1 | 1 | 1 | 1 | 1 |

In the above table, it is seen that the binary digits of equal order are represented by the letters X and Y, while the carry digits which resulted from the addition of the two next lower order binary numbers are represented by the letter Z. In the binary number system, a digit may have only the two unique values of 0 or 1. Thus if 0 digit inputs are present at X, Y, and Z, both the output sum and the carry digits are 0. If only one input binary digit of 1 is present, whether it be X, Y, or Z, then the sum output digit is 1 while the carry digit is 0. If any two input digits are 1, the carry digit is 1 while the sum digit is 0. Further, if all three input digits are 1, then both sum and carry output digits are 1.

This invention consists of a circuit employing two transistor structures which are interconnected so as to perform the above binary full addition operations. Furthermore, another important feature of this invention resides in the fact that by varying the external circuit parameters, other logical operations can be performed by this circuit besides that of full binary addition. The invention behaves in a manner analogous to a unique transistor structure disclosed in an article by R. F. Rutz entitled "Two Collector Transistors for Binary Full Addition" which appears in the IBM Journal of July 1957, pages 212–222. That article discusses a multielectrode transistor which is designed for performing relatively complex logical operations. The transistor therein disclosed has an input terminal which is a single electrode broad area emitter, in which signals representing the three input binary digits are mixed. The sum and carry outputs are two collectors each with high current multiplication factors.

The present invention differs from that disclosed in the above identified article in that two separate transistor structures are employed, each having an emitter, a base, and a collector. However, both emitters of the transistor structures are connected in common, and the collector of one serves as the sum output while the collector of the other serves as the carry output. Each transistor structure has two current conduction states, with one state being represented by a low collector current output while the other state is represented by a high collector current output. Signals representing the three input binary digits X, Y and Z are connected in parallel to the common emitter input of the transistor structures, and the magnitude of the emitter current is directly proportional to the number of inputs present. Thus, with no input digit signal present, the input emitter current has a zero unit magnitude. Also, with no inputs present, both collectors of the structures will be in a low current conduction state, while with all three inputs present, both collectors will be in a high current conduction state. With only one input present, the collector of one transistor structure will be in its high current conduction state while the collector of the other transistor structure is in its low current conduction state. With two of three inputs present, the first collector will be in its low current conduction state while the second collector will be in its high current conduction state. The first collector therefore is considered to be the sum output terminal, while the second collector is the carry output terminal. Although the single transistor full adder circuit which is disclosed in the above-identified Rutz article performs in like fashion, the present invention utilizes two transistor structures, neither of which requires any unusual care in its fabrication.

It is therefore an object of the present invention to provide a logical operation circuit comprising first and second semi-conductor transistor structures each having an emitter, a collector, and a base, and each having a current multiplication factor alpha greater than 1, means for respectively reverse biasing said collectors so that the magnitude of the collector saturation current of said first transistor structure substantially differs from the magnitude of the collector saturation current of said second transistor structure, means for coupling said biases through respective impedance means to a common return path and input means for introducing a variable signal in common to said emitters.

It is a further object of the present invention to provide a full binary adder circuit employing two interconnected transistor structures which provides digital sum and carry outputs in response to the analog addition of currents at a common input.

It is yet another object of the present invention to interconnect two transistor structures, each having a relatively large collector multiplication factor, so as to provide sum and carry outputs in response to three binary digital inputs.

Other and further objects of the present invention will be pointed out in the following description of the invention to be taken with the accompanying drawings, in which.

Figure 1:
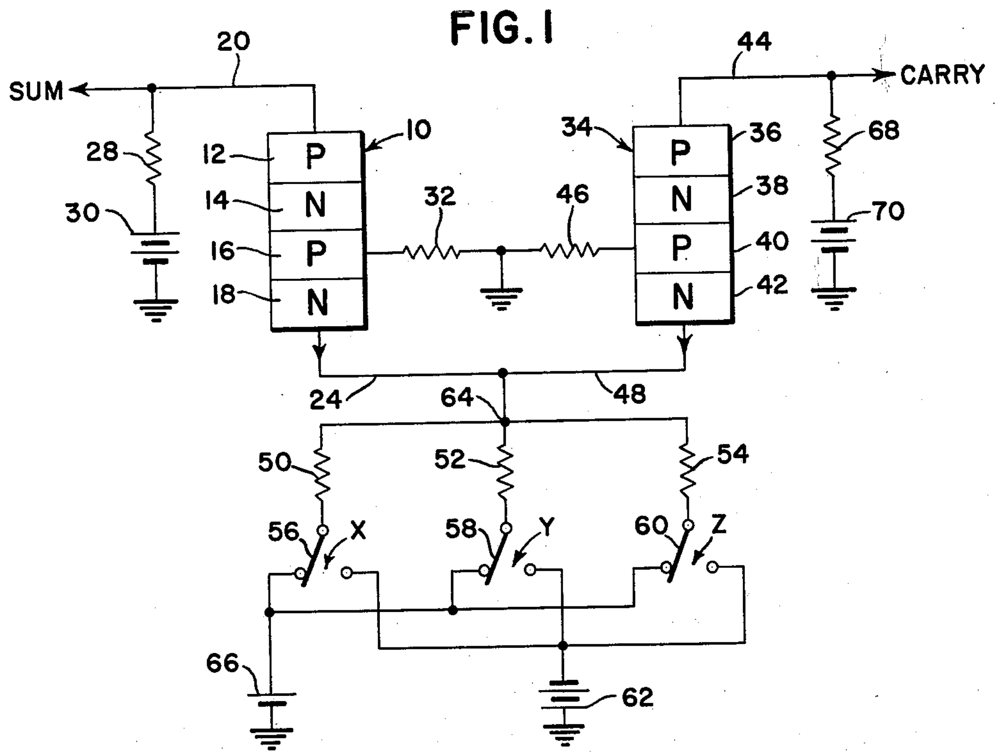
FIGURE 1 shows a diagrammatic view of a logical operation circuit performing the function of a binary full adder.

Referring now to the drawings, FIG. 1 shows one embodiment of the logical circuit of the invention which performs a binary full addition function. Transistor structures 10 and 34 each consist of an N-P-N-P junction transistor which are coupled together in a new and novel manner. In the arrangement shown, outer N-regions 18 and 42 are respectively utilized as the emitters for the transistors, while P-N-regions 12–14 and 36–38 are used as the collectors for transistors 10 and 34, respectively. The inner P-regions 16 and 40 are utilized as the bases for their respective transistors. The collector of transistor 10 is connected through resistor 28 to a voltage bias source 30 so as to reverse bias the collector junction between N-region 14 and P-region 16. In like manner, the collector of transistor 34 is connected through resistor 68 to a voltage bias source 70 so as to reverse bias the collector junction between N-region 38 and P-region 40. Base regions 16 and 40 are each connected through their respective resistors 32 and 46 to a common current return path so as to complete the collector and emitter circuits for their respective transistors. The emitter regions 18 and 42 are commoned at junction 64.

Resistors 50, 52, and 54 provide input impedance means whereby a multi-level signal is applied to the commoned emitters of transistors 10 and 34. One terminal of each of the resistors 50, 52, and 54 is connected to junction 64 which is common to emitters 18 and 42 of the transistors. The other terminal of each resistor 50, 52 and 54 is adapted to receive a bi-level input signal which represents the value of a binary digit X, Y, or Z, respectively. The means shown in FIGURE 1 for accomplishing this function is merely diagrammatical in nature and employs a set of single-pole, double-throw switches 56, 58 and 60 in order to selectively connect their respective resistors 50, 52, and 54 to either one of the voltage sources 62 or 66. The purpose of showing these rather simplified switches is merely to illustrate in a convenient manner the bi-level nature of the signals applied to the input resistors, one level representing a 0 value while the other level represents a 1 value in the binary number system. Obviously, other means, such as two level dynamic pulse trains could be employed to apply such signals to the circuit.

The operation of full binary addition in performed by the logical circuit of FIGURE 1 in the following manner, with reference being made to Table 1.

For any of the X, Y or Z input binary digits, the connection of its associated switch 56, 58, or 60 to voltage source 66 indicates a value of binary 0, while the connection of its associated switch to source 62 indicates a value of 1. When the value of all three input binary digits is 0, neither transistor 10 nor transistor 34 is conducting so that there is no substantial current flow in their collector circuits. The potentials at terminal 20 and terminal 44 are therefore approximately equal to the magnitude of their respective bias sources 30 and 70. When only one of the input digits has a value of 1, transistor 10 is full conducting at a saturated condition while transistor 34 is still cut off. The current flow in the collector circuit of transistor 10 therefore causes a drop through resistor 28 so that the potential at terminal 20 is substantially lower than the potential at terminal 44. If any two of the three digit inputs have a value of 1, then transistor 34 is fully conducting at a saturated condition while transistor 10 is cut off. This creates a drop in resistor 68 which causes the potential at terminal 44 to be substantially lower than potential at terminal

20. When all three digit inputs have a value of 1, then both transistors 10 and 34 are fully conducting so that the potentials at their respective output terminals 20 and 44 are substantially lower than the potentials present here when transistors are not conducting. Therefore, in accordance with Table 1, terminal 20 of transistor 10 is considered as the sum output of the full adder circuit while terminal 44 of transistor 34 is considered as the carry output.

Figure 3:
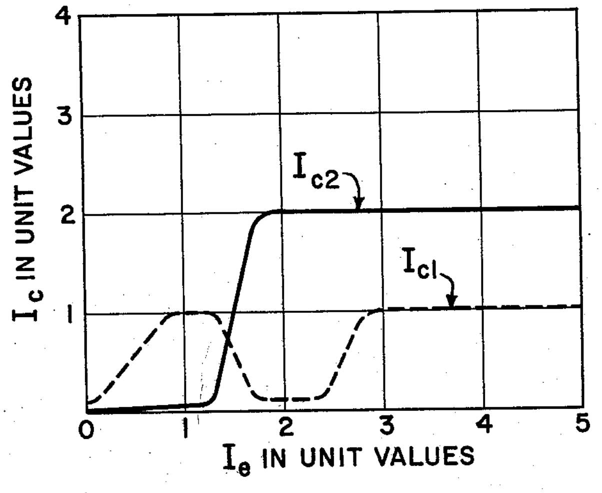
FIGURE 3 shows a graph of the common emitter current versus the two collector output currents of the transistors.

The physical process by which full addition is accomplished in the circuit of FIGURE 1 will now be explained in connection with FIGURES 2 and 3. The essence of this invention lies in the fact that for a one unit value of emitter current, the magnitude of which is created by the effective resistance found between source 62 and the common emitter terminal 64, transistor 10 initially accepts most of this current and thus begins to conduct. When conducting, transistor 10, by a process explained below, effectively prevents transistor 34 from accepting any of this emitter current and from thus being turned on. Upon increasing the emitter current to a two-unit value by the reduction of the effective resistance, the collector circuit of transistor 10 becomes saturated in that a greater increase of collector current is impossible. When this occurs, transistor 34 begins to accept some of the increased emitter currents and so conducts, which in turn immediately decreases the conduction of transistor 10 which is eventually turned off. Upon the emitter current increasing yet further to a three-unit value, the collector circuit of transistor 34 becomes saturated and a portion of the increased emitter current will flow to transistor 10 which again conducts.

Figure 2A:
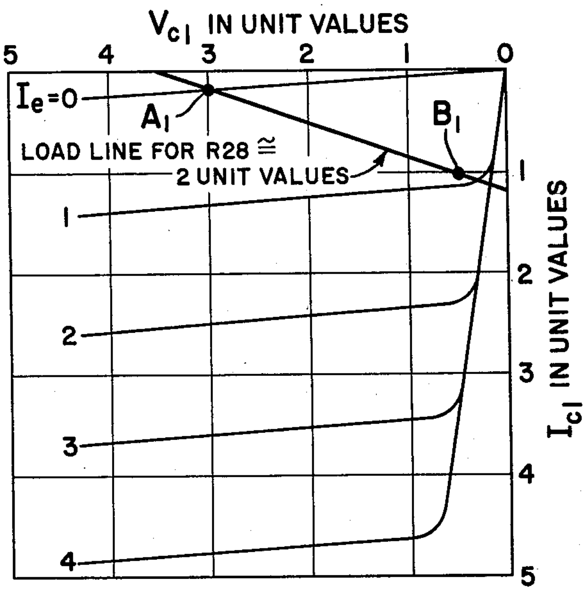
FIGURES 2A and 2B show the collector characteristics of each of the transistors in the circuit of FIGURE 1.

Referring now to FIGURE 2A, this graph shows the collector characteristics of transistor 10. The abscissa represents the collector voltage while the ordinate represents the collector current. All values are relative in that they represent unit magnitudes which should not necessarily be construed in terms of volts or amperes. The oblique line which intersects both the abscissa and ordinate represents the load line for output resistor 28 in the circuit of FIGURE 1. Point A indicates the approximate value of the collector current when the emitter current to transistor 10 is zero, while point B approximately indicates the maximum value of collector current which is possible to obtain with this value of resistor 28. As can be shown, this saturation collector current of transistor 10 is approximately one unit value.

Figure 2B:
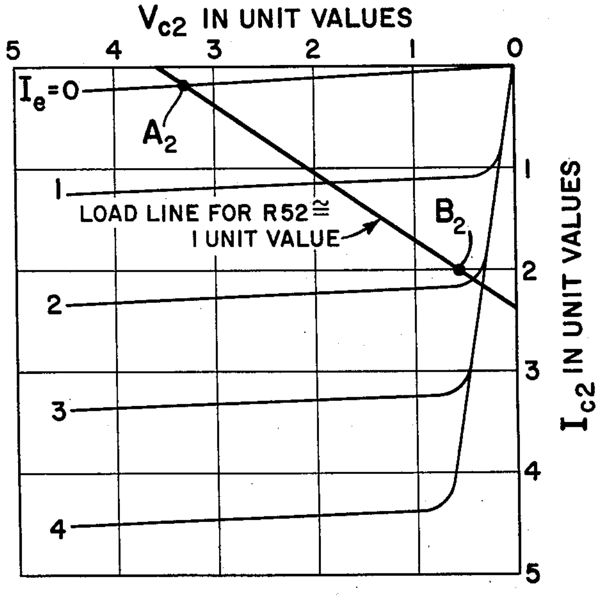

FIGURE 2B is a graph of collector characteristics for transistor 34, in which the load line for resistor 68 is indicated. Point $B_2$ indicates approximately the magnitude of the saturation collector current for transistor 34 which is about two unit values. Thus, the magnitude of the collector saturation current for transistor 34 is approximately twice that for transistor 10. If both voltage bias sources 30 and 70 are made approximately equal, then resistor 28 must be approximately twice the value of resistor 68 in order to obtain these aforementioned magnitudes of collector saturation currents. Furthermore, as shown in FIGURE 2A, the approximate value of emitter current which causes the saturation collector current in transistor 10 is slightly less than one unit value, while the value of emitter current which causes the saturation current in transistor 34 is slightly less than two unit values.

Input resistors 50, 52 and 54 should be approximately equal in magnitude so that the value of emitter current applied to transistors 10 and 34 will be varied in equal steps. For example, when switches 56, 58 and 60 are all moved to their left hand positions as illustrated in FIGURE 1, the emitter junctions of both transistors are reverse biased so that substantially no emitter current may flow thereacross to junction 64. At this position, the value of all three input binary digits is 0. When one of the switches is turned to its right hand position, both emitter junctions are initially forward biased by virtue of their N-emitter regions being placed at a potential lower than their P-base regions. Therefore, an emitter current begins to flow whose value is dependent upon the magnitude of the one input resistor which is connected to source 62. Such an emitter current is considered for the purposes of this description, as having a magnitude of one unit value. Upon two of the switches being moved to their right hand positions, the effective resistance between source 62 and junction 64 is reduced by one-half so that two unit values of emitter current can flow. When all three switches are moved to their right hand positions, thus representing that all three input binary digits have the value of 1, the effective resistance between source 62 and terminal 64 is one-third of the original value so that three unit values of emitter current can flow.

Both transistors 10 and 34 shown in the embodiment of FIGURE 1 may be N-P-N-P hook collector transistors which are well known in the art. A characteristic of such transistors is that they have a high current amplification factor "alpha" which is due to the presence of the P-N hook collector regions 12–14 and 36–38 of the transistors 10 and 34, respectively. This results in a large increase in collector current for a relatively small increase in emitter current. In each N-P-N-P transistor in FIGURE 1, the collector current flows from its positive output biasing source into the transistor and the emitter current flows out therefrom to negative source 62. Therefore, since the sum of input and output currents in any transistor must equal 0, the base current must flow out from the transistor to ground in order that the sum of the emitter and base currents equal the value of the high collector current. Furthermore, the collector characteristics of transistors 10 and 34 in FIGURE 2 should not be exactly similar. The reason for this is that upon the initiation of one unit value emitter current, it is desired that transistor 10 begin to conduct more heavily than transistor 34 for reasons to be given hereinafter. Such a situation may be created by selecting for transistor 10 a unit with a value of alpha slightly higher than that of transistor 34.

The physical operation of the full adder circuit will now be described with particular reference to FIGURE 3. Upon closing only one of the switches 56, 58, or 60 to its right hand position, the common emitter current at junction 64 begins to increase as shown in FIGURE 3 towards a one-unit value. Because of the aforementioned differences in collector characteristics, transistor 10 begins to conduct more heavily than transistor 34. This conduction of transistor 10 creates a large base current flowing through its resistor 32 to ground which further increases the forward bias on its emitter junction. However, the emitter junction of transistor 10 can only support a certain maximum forward bias across it for the current which is flowing through it. Therefore, the voltage of outer N-region 18 will begin to rise so as to maintain this limiting maximum voltage potential across the emitter junction. In so doing, the voltage of N-region 42 in transistor 34 must also begin to rise since it is commoned with region 18. This increase in potential of region 42 may be so great as to cause the emitter junction in transistor 34 to be reverse biased, thus cutting off any substantial flow of collector current and emitter current therein. Upon the emitter current finally reaching a one unit value, the value of collector current in transistor 10 is approximately one unit while the collector current in transistor 34 is substantially zero. Furthermore, transistor 10 is accepting all of the emitter current at junction 64. This condition is seen in FIGURE 3 where the $I_{c1}$ curve is representative of the collector current in transistor 10 and the $I_{c2}$ curve is representative of the collector current in transistor 34, both being plotted against the common emitter current at junction 64.

Upon throwing any two of the switches to their right hand positions the emitter current begins to increase from a one unit value to a two unit value. However, according to FIGURE 2A, the collector current of transistor 10 has reached its saturation point with an emitter current of one unit value and can therefore no longer be increased by an increase in its emitter current. Therefore, the increasing emitter current flowing from transistor 10 results in a decrease of its base current flowing through resistor 32 so that the forward bias on emitter junction in transistor 10 decreases. N-region 18 of transistor 10 now drops in potential and carries with it the potential of N-region 42 in transistor 34 which eventually falls below that of the base P-region 40. This creates a forward bias condition on the emitter junction in transistor 34 so that it can now begin to conduct. Upon conduction of transistor 34, a large collector current begins to flow which thereupon results in a large base current flowing from base P-region 40 through resistor 46 to ground. Since the emitter junction in transistor 34 can only support a limited forward bias across it, emitter N-region 42 drifts upward in potential which tends to further reduce the bias across the emitter junction in transistor 10 and may eventually cut that transistor off completely. Transistor 34 thereupon accepts substantially all of the emitter current flowing through junction 64. As shown in FIGURE 3, with an emitter current of two unit value, the collector current of transistor 34 is at its saturation value of two units while the collector current of transistor 10 is substantially zero.

When the emitter current at junction 64 is increased to a magnitude of three units, which occurs when all three switches are moved to their right hand position, the collector current of transistor 34 can not be increased due to the fact that it is saturated with an emitter current of two units. The increase in the emitter current through transistor 34 thereupon results in its base current through resistor 46 being decreased. This reduces the forward bias across the emitter of transistor 34 so that transistor 10 now becomes forward biased again and begins to conduct, accepting a portion of the emitter current at junction 64. However, in this case, transistor 34 is not turned off since there is enough current left flowing in its base circuit when 10 turns on for it to stay on. At an emitter current value of three units, FIGURE 3 shows that saturation current is flowing in the collector circuits of both transistors, thus indicating that both a sum and the carry has resulted from the addition. Upon reducing the emitter current at terminal 64 by selectively moving the switches to their left hand positions, a reverse process takes place, similar to that described above.

Other transistor structures having a current multiplication factor greater than 1 may be employed in the adder of FIGURE 1. For example, a point contact transistor exhibits an alpha greater than 1. Furthermore, an equivalent circuit of the N-P-N-P transistor may be formed by interconnecting two, three-region junction transistors, such as a P-N-P and an N-P-N, in a manner shown in an article by J. J. Ebers, entitled "Four Terminal P-N-P-N Transistors" appearing in the IRE Proceedings, November 1952, pages 1361 et seq.

The circuit of FIGURE 1 can also be modified so as to perform logical operations other than full binary addition by merely varying the number and magnitude of the input resistors, and by varying the relative magnitudes of the collector saturation currents of the two transistor structures.

What has been described is a logical operations circuit which performs the function of full binary addition by employing two interconnected transistor structures, each having a current multiplication factor greater than 1, whose bases are coupled to a current return path through impedances and whose collector circuits have loads so proportioned that the saturation collector current of one is approximately twice that of the other, with an emitter current common to both which first causes one transistor to conduct and keep the other transistor in a state of non-conduction, there being a switching process at a certain value of the emitter current so that the other transistor conducts while the first transistor is non-conducting, there also being a third state in which both transistors are conducting.

Although the invention has been described with reference to a preferred embodiment, it will be understood that many modifications and changes therein will occur to those skilled in the art without departing from the spirit of the invention. Accordingly, the scope of the invention is not intended to be limited except as defined by the following claims.

What is claimed is:

1. A logical operation circuit comprising first and second semi-conductor transistor structures each having an emitter, a collector, and a base, and each having a current multiplication factor alpna greater than 1, said first transistor having an alpha slightly greater than the alpha of said second transistor, means for respectively reverse biasing said collectors so that the magnitude of the collector saturation current of said second transistor structure is apuroximately twice the magnitude of the collector saturation current of said second transistor structure, means for coupling said bases through respective impedance means to a common return path, and input means for introducing a variable signal in common to said emitters.

2. A logical operation circuit according to claim 1 in which said means for reverse biasing said collectors comprise first and second output impedance means respectively coupling the collectors of said first and second transistor structures to a voltage biasing source, with the magnitude of said first output impedance means being substantially different from the magnitude of said second output impedance means.

3. A logical operation circuit according to claim 2 in which said first and second transistor structures each comprise a single body N-P-N-P transistor.

4. A logical operation circuit comprising a first semiconductor transistor structure having an emitter, a collector, and a base which exhibits a current multiplication factor alpha greater than 1, a second semi-conductor transistor structure having an emitter, a collector, and a base which exhibits a current multiplication factor alpha greater than 1, said first transistor having an alpha slightly greater than the alpha of said second transistor first and second output impedance means respectively coupling the collectors of said first and second transistor structures to a voltage biasing source, said first and second output impedance means having relative magnitudes such that said second transistor has a saturation current which is approximately twice the saturation current of said first transistor, first and second base impedance means respectively coupling the bases of said first and second transistor structures to a common return path, a plurality of input impedance means connected to a common terminal which are adapted to receive input signals, and means coupling the emitters of first and second transistor structures to said common terminal.

5. A circuit according to claim 4 in which the magnitude of said first output impedance is approximately twice the magnitude of said second output impedance, said plurality of input impedances comprises three input impedances of equal magnitude.

6. A circuit according to claim 4 in which said first and second transistor structures each comprise a single body N-P-N-P transistor.

7. A circuit according to claim 6 in which the magnitude of said first output impedance is approximately twice the magnitude of said second output impedance, and said plurality of input impedances comprises three input impedances of equal magnitude.

8. A circuit according to claim 6 in which the outer N-regions of said transistors serve as said emitters, the outer P-N regions serve as said collectors, and the inner P-regions serve as said bases.

9. A circuit according to claim 8 in which the magnitude of said first output impedance is approximately twice the magnitude of said second output impedance, and said plurality of input impedances comprises three input impedances of equal magnitude.

10. A full adder circuit comprising a first semiconductor transistor structure having an emitter, a collector, and a base which exhibits a current multiplication factor alpha greater than 1, a second semi-conductor transistor structure having an emitter, a collector, and a base which exhibits a current multiplication factor alpha greater than 1, said first transistor having an alpha slightly greater than the alpha of said second transistor first and second output impedance means respectively coupling the collectors of said first and second transistor structures to a voltage biasing source, with the relative magnitudes of said first and second output impedance means being such that the value of the collector saturation current of said second transistor structure is approximately twice the value of the collector saturation current of said first transistor structure, first and second base impedance means respectively coupling the bases of said first and second transistor structures to a common return path, threee input impedance means of equal magnitude connected to a common terminal which are adapted to receive input signals, and means coupling the emitters of said first and second transistor structures to said common terminal.

11. A full adder circuit according to claim 10 in which said first and second transistor structures each comprises a single body N-P-N-P transistor.

12. A full adder circuit according to claim 11 in which the outer N-regions of said transistors serve as said emitters, the outer P-N regions serve as said collectors, and the inner P-regions serve as said bases.

References Cited in the file of this patent

UNITED STATES PATENTS

| | | |
|---|---|---|
| 2,891,171 | Shockley | June 16, 1959 |
| 2,895,058 | Pankove | July 14, 1959 |
| 2,927,733 | Campbell | Mar. 8, 1960 |
| 3,014,663 | Horton et al. | Dec. 26, 1961 |

OTHER REFERENCES

IBM Journal, July 1957, pages 212–222, "Two-Collector Transistor for Binary Full Addition," Rutz (TK 7885, A115).